June 8, 1937.  A. P. STEINHILPER  2,082,987
ELECTRIC RAZOR
Filed July 15, 1936    2 Sheets-Sheet 1

Inventor
Andrew P. Steinhilper,

By Clarence A. O'Brien
Hyman Berman
Attorneys

June 8, 1937. A. P. STEINHILPER. 2,082,987
ELECTRIC RAZOR
Filed July 15, 1936 2 Sheets-Sheet 2

Inventor
Andrew P. Steinhilper.

By Clarence A. O'Brien
Hyman Berman
Attorneys

Patented June 8, 1937

2,082,987

UNITED STATES PATENT OFFICE 2,082,987

ELECTRIC RAZOR

Andrew P. Steinhilper, Williamsport, Pa.

Application July 15, 1936, Serial No. 90,761

4 Claims. (Cl. 30—43)

This invention relates to electric razors and an object of the invention is to provide a razor of this character characterized by simplicity of construction, combination and arrangement of parts; and which is further characterized by having the handle equipped at the end thereof provided with the guard and motor driven blade with a casing to receive the cut hairs, and which casing may be readily cleaned.

The invention together with its objects and advantages will be best understood from a study of the following description taken in connection with the accompanying drawings wherein:—

Figure 1:
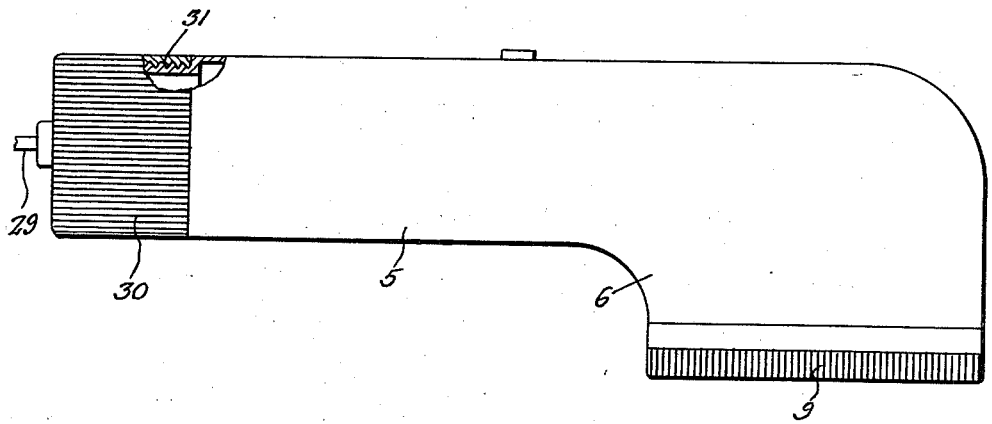
Figure 1 is a side elevational view of the razor.
Figure 2:
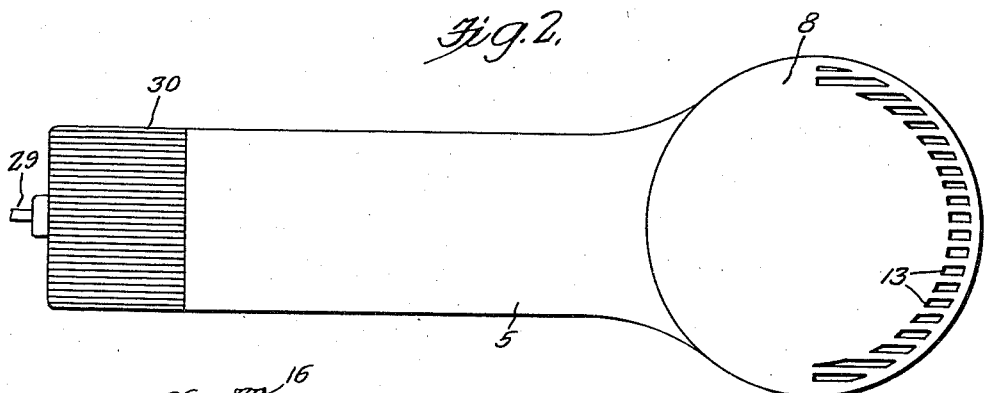
Figure 2 is a bottom plan view thereof.

Referring to the drawings by reference numerals it will be seen that in the preferred embodiment thereof the improved electric razor comprises a tubular handle 5 of suitable length and which is provided at one end, preferably by being integral therewith, with an enlarged substantially cylindrical casing 6 which projects laterally from the handle 5 and has an open end 7 externally threaded. A substantially flat disklike guard member 8 is provided and is equipped at its marginal edge with an annular internally threaded flange 9 adapted to be screwed onto the end 7 of the casing 6 for securing the guard on the open end of the casing.

Adapted to rest on the guard 8 and having a rotating fit within the end 7 of the casing 6 is a disk blade 10 provided adjacent its peripheral edge with a circular series of relatively spaced slots 11 the walls of which at one side of the slots are suitably bevelled to present cutting edges 12.

The guard 8 is provided with an arcuate series of relatively spaced slots 13 the walls of which at one side are suitably bevelled to provide cutting edges 14 cooperable with the cutting edges 12 of the blade 10 for shearing the hairs from the face.

Suitably mounted and secured within the casing 6 is an electric motor 15 having an armature shaft 16 provided at its free end with a socket 17 that is internally squared to receive the squared end 18 of a shaft section 19.

Figure 6:
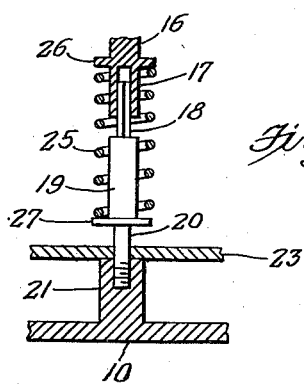
Figure 6 is a detail view partly in section and partly in elevation showing the connection between the motor and the rotary blade.
Figure 3:
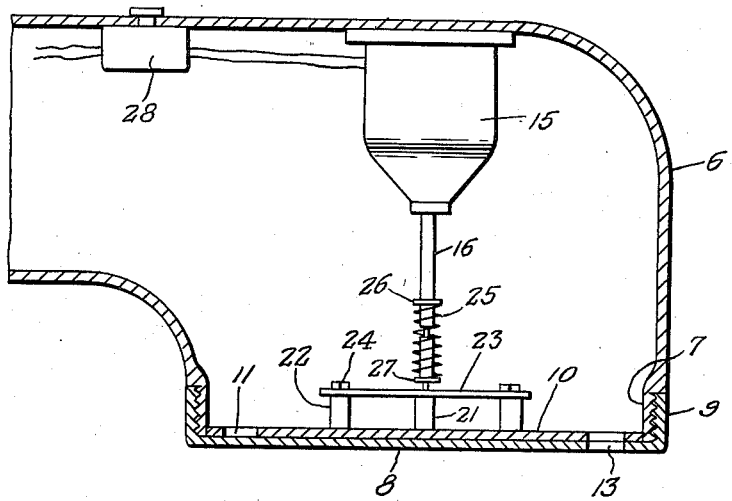
Figure 3 is a vertical sectional view through one end of the razor.
Figure 4:
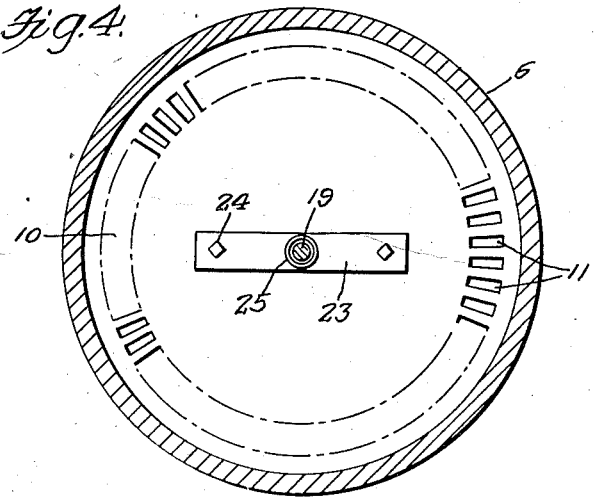
Figure 4 is a horizontal sectional view through the casing-equipped end of the razor.
Figure 5:
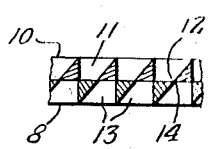
Figure 5 is a detail sectional view through the guard and rotary blade.

As best shown in Figure 6 the shaft 19 has a threaded end 20 that is threaded into a boss 21 provided on one side and at about the center of the blade 10.

Also secured to the blade 10 and disposed at opposite sides of the boss 21 are additional bosses 22 which support therebetween a brace plate 23 that is secured to the bosses 22 through the medium of screws or the like 24. An intermediate portion of the brace plate 23 rests on the boss 21 and is suitably apertured to accommodate the end 20 of shaft 19.

For yieldably urging the blade 10 into frictional contact with the guard 8 to insure proper co-action between the edges 12 of the blade and the edges 14 of the guard 8 there is disposed about the shaft 19 and the socket end 17 of shaft 16 a coil spring 25 one end of which impinges against a shoulder 26 on the shaft 16 and the other end of which impinges against a shoulder 27 on the shaft 19.

Electrically connected with the motor 15 is a switch 28 suitably mounted on the handle 8 adjacent the casing end 6 of the handle and which may be readily manipulated by the thumb of the hand grasping the handle 5 for controlling the circuit to the motor 15.

The electric cord connected with the switch 28 and motor 15 is indicated by the reference numeral 29 and this cord is trained through the crown of a cap member 30 which is screwed onto the end of the handle 5 remote from the casing 6 as at 31.

It will be seen that the shape of the handle 5 and casing 6 is such as to permit the razor to be conveniently grasped in one hand and to be manipulated with facility during the actual shaving. Also, with the circuit to the motor 15 closed disk 10 will be driven from the motor to rotate relative to the guard 8 and the cutting edges 12 of the blade 10 will cooperate with the cutting edges 14 of the guard to effect a shearing action in a manner tending to produce a clean shave.

The hairs cut incidental to the shaving of the face will be received within the casing 6 and when it is desired to clean the razor the guard 8 may be readily unscrewed from the end 7 of the casing permitting emptying of the casing and also permitting access to be had to the blade 10 for removing the blade and thoroughly washing the same.

It is thought that a clear understanding of the construction, utility and advantages of an invention of this character will be had without a more detailed description.

Having thus described the invention what is claimed as new is:—

1. An electric razor comprising a tubular handle provided at one end with an integral substantially circular casing projecting laterally from the handle, said casing having an open end and provided at said open end with threads on the peripheral wall of the casing, a guard member having an internally threaded marginal flange threadedly engaged with the casing at said open end, said guard member being provided with an arcuate series of relatively spaced slots one side of which are bevelled to present cutting edges, a disk blade arranged in the casing and resting on said guard and provided with a circular series of slots, one side of which are bevelled to present cutting edges cooperable with the cutting edges of the guard, a motor mounted in said casing and a driving connection between the motor and said disk-blade for driving the latter.

2. An electric razor comprising a tubular handle provided at one end with an integral substantially circular casing projecting laterally from the handle, said casing having an open end and provided at said open end with threads on the peripheral wall of the casing, a guard member having an internally threaded marginal flange threadedly engaged with the casing at said open end, said guard member being provided with an arcuate series of relatively spaced slots one side of which are bevelled to present cutting edges, a disk-blade arranged in the casing and resting on said guard and provided with a circular series of slots, one side of which are bevelled to present cutting edges cooperable with the cutting edges of the guard, a motor mounted in said casing and a driving connection between the motor and said disk-blade for driving the latter, said driving connection including a resilient connection between the shaft of the motor and said blade tending to yieldably urge the blade into flat contact with the inner side of said guard.

3. An electric razor comprising a tubular handle provided at one end with an integral substantially circular casing projecting laterally from the handle, said casing having an open end and provided at said open end with threads on the peripheral wall of the casing, a guard member having an internally threaded marginal flange threadedly engaged with the casing at said open end, said guard member being provided with an arcuate series of relatively spaced slots one side of which are bevelled to present cutting edges, a disk-blade arranged in the casing and resting on said guard and provided with a circular series of slots, one side of which are bevelled to present cutting edges cooperable with the cutting edges of the guard, a motor mounted in said casing and a driving connection between the motor and said disk-blade for driving the latter, said driving connection including a resilient connection between the shaft of the motor and said blade tending to yieldably urge the blade into flat contact with the inner side of said guard, and a switch mounted on said handle and electrically connected with the motor for controlling the circuit to the motor.

4. An electric razor comprising a tubular handle provided at one end with an integral substantially circular casing projecting laterally from the handle, said casing having an open end and provided at said open end with threads on the peripheral wall of the casing, a guard member having an internally threaded marginal flange threadedly engaged with the casing at said open end, said guard member being provided with an arcuate series of relatively spaced slots one side of which are bevelled to present cutting edges, a disk-blade arranged in the casing and resting on said guard and provided with a circular series of slots, one side of which are bevelled to present cutting edges cooperable with the cutting edges of the guard, a motor mounted in said casing and a driving connection between the motor and said disk-blade for driving the latter, said driving connection including a resilient connection between the shaft of the motor and said blade tending to yieldably urge the blade into flat contact with the inner side of said guard, and a switch mounted on said handle and electrically connected with the motor for controlling the circuit to the motor, and said handle at the end thereof remote from said casing being threaded, a cap threadedly engaged with the last named end of said handle, and said cap being provided with an opening to accommodate an electric cord the wires of which are connected with the switch and motor.

ANDREW P. STEINHILPER.